United States Patent [19]
Geiger

[11] Patent Number: 5,377,219
[45] Date of Patent: Dec. 27, 1994

[54] WAVELENGTH MATCHED OPO/OPA UNIT

[76] Inventor: Allen R. Geiger, 300 No. Telshor, Las Cruces, N. Mex. 88001

[21] Appl. No.: 144,887

[22] Filed: Oct. 27, 1993

[51] Int. Cl.$^5$ .................... H01S 3/082; G02F 1/39; G01S 17/02
[52] U.S. Cl. .................... 372/97; 372/20; 359/330; 356/301; 356/5
[58] Field of Search .................... 372/97, 20, 23, 38, 372/70; 359/330; 356/301, 4, 28.5, 5

[56] References Cited

U.S. PATENT DOCUMENTS

| | | | |
|---|---|---|---|
| 4,180,751 | 12/1979 | Ammann | 307/428 |
| 5,053,641 | 10/1991 | Cheng et al. | 359/330 |
| 5,070,260 | 12/1991 | Wong | 359/330 |
| 5,079,445 | 1/1992 | Guyer | 359/330 |
| 5,088,096 | 2/1992 | Pocholle et al. | 372/20 |
| 5,157,257 | 10/1992 | Geiger | 250/338.5 |
| 5,195,104 | 3/1993 | Geiger et al. | 372/97 |
| 5,216,259 | 6/1993 | Stern et al. | 356/5 |
| 5,275,168 | 1/1994 | Reintjes et al. | 356/301 |
| 5,303,710 | 4/1994 | Bashkansky et al. | 356/301 |

OTHER PUBLICATIONS

Cordova-Plaza et al., "Miniature CW and Active Internally Q-Switched Nd:MgO:LiNbO3 Lasers", IEEE Journal of Quantum Electronics, vol. QE-23, No. 2, Feb. 1987, pp. 262-266.

W. Brunner et al., "Theory of Optical Parametric Amplification and Oscillation", Progress In Optics, vol. XV, North-Holland Publishing Company, 1977, pp. 44-49. (No month available).

*Primary Examiner*—Rodney B. Bovernick
*Assistant Examiner*—Robert McNutt
*Attorney, Agent, or Firm*—Kramer, Brufsky & Cifelli

[57] ABSTRACT

A device includes a transmitter for transmitting a first optical signal towards a target, which incorporates an optical parametric oscillator. A receiver is capable of receiving a second optical signal from said target. The second optical signal is the reflected signal from the first signal. The receiver means comprises an optical parametric amplifier. A wavelength matching device matches the wavelengths produced by the optical parametric oscillator with that received from the optical parametric amplifier. The optical parametric amplifier is typically joined with a laser to form an optical parametric amplifier laser, while the optical parametric oscillator is joined with a laser to form an optical parametric oscillator laser.

17 Claims, 12 Drawing Sheets

- OPTICAL DELAY LINE
  FIBER SPOOL WITH MODE
  COUPLED LIQUID CRYSTAL
  SWITCH (1.4μm - 2.0μm)

FIG. 12 ively in a manner described in U.S. Pat. No. 5,195,104,
WAVELENGTH MATCHED OPO/OPA UNIT

FIELD OF THE INVENTION

The present invention relates to systems formed from optical parametric oscillator laser (OPOL) unit to be utilized in combination with optical parametric amplifier laser (OPAL), and more particularly the use of the above systems in light detection and ranging (lidar) systems.

BACKGROUND OF THE INVENTION

Laser remote sensing can either be used to sense the particulars about remote solid objects (and as such is called laser radar), or it can be used to sense spectroscopic or aerosol returns (and as such is called lidar which stands for light detection and ranging). There are several methods of remote laser detection involving lidar. These methods include direct detection, absorption, florescence, differential absorption, and Raman scattering which are known to those skilled in the art. Some of the limiting factors to lidar which include wavelength adjustability or agility (most presently used lasers have a fixed frequency); and the general size and weight of the laser equipment. Of the above, the wavelength agility presents the greatest challenges.

The first attempt to overcome the wavelength agility problem included the use of dye lasers. These units, however, require a pump laser (and the dyes used as the lasing medium are toxic). These lasers are also more difficult to adjust than may be desired.

Diode lasers have also been utilized in an attempt to solve the wavelength agility problem. These lasers, however, have limited tunability. Also, in the infrared range diode lasers must be cryogenically cooled which further complicates these lasers and makes them more expensive.

The third technique attempted to overcome this problem uses an optical parametric oscillator (OPO) as the frequency agile source. OPOs require a pump laser which use flashlamp pumped solid state lasing materials such as Nd:YAG. These pump sources are large and heavy and the beam quality required to pump the parametric oscillators satisfactorily are difficult to achieve, resulting in overall poor parametric oscillator performance.

The receiver in the above lidars typically use filters to separate the transmitted wavelengths. However, with a tunable source, a corresponding tunable receiver is required. In the past, spectrometers have provided the spectral dispersion required by tunable systems. Spectrometers, however, tend to be quite heavy and delicate.

SUMMARY OF THE INVENTION

According to the present invention, a device includes a transmitter for transmitting a first optical signal towards a target, which incorporates an optical parametric oscillator. A receiver is capable of receiving a second optical signal from said target. The second optical signal is the reflected signal from the first signal. The receiver means comprises an optical parametric amplifier. A wavelength matching device matches the wavelengths produced by the optical parametric oscillator with that received from the optical parametric amplifier.

DETAILED DESCRIPTION

In this disclosure, elements which perform similar functions in different embodiments are often provided with identical reference characters.

Optical parametric oscillators and optical parametric amplifiers have been combined with laser systems to produce optical parametric oscillator lasers (OPOL) and optical parametric amplifier lasers (OPAL), respectively in a manner described in U.S. Pat. No. 5,195,104, issued Mar. 16, 1993, incorporated herein by reference.

Figure 1:
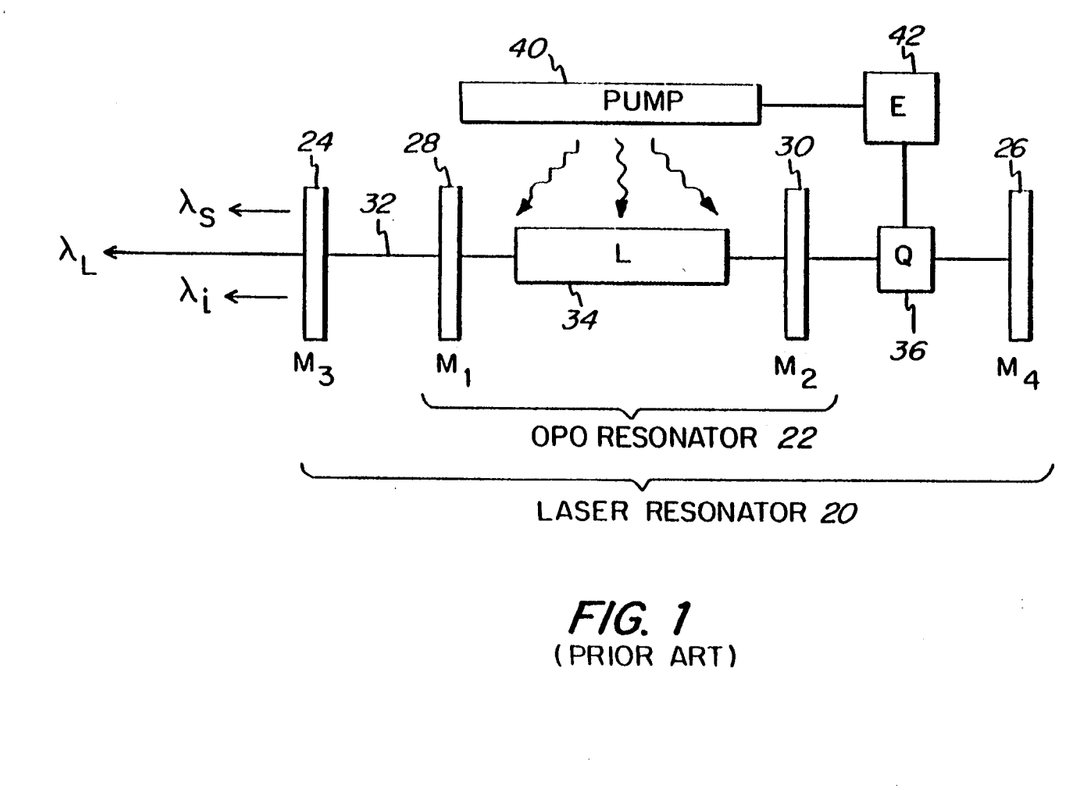
FIG. 1 illustrates a diagram of an OPOL system of the prior art.

A schematic diagram of one embodiment of an optical parametric oscillator laser system of U.S. Pat. No. 5,195,104 is illustrated in FIG. 1. An embedded dual optical resonator includes a laser resonator 20 and an optical parametric oscillator resonator 22. The laser resonator 20 includes two laser resonator mirrors 24, 26 which are spaced apart to define an optical cavity between them. The optical parametric resonator (OPO) resonator 22 includes two OPO mirrors 28, 30 which are spaced apart to define an optical cavity between them. The laser resonator 20 and the OPO resonator 22 have a common optical axis 32. The OPO resonator 22 is contained entirely within the laser resonator 20, and shares the same optical axis 32. Thus the cavity region between OPO mirrors 28 and 30 is common to both the laser resonator 20 and the OPO resonator 22. An OPOL crystal or rod 34 of an optical parametric oscillator laser material (as described below) is positioned in the common cavity region of the dual optical resonator between OPO mirrors 28 and 30. A crystallographic axis of the OPOL crystal (not shown) is collinear with the optical axis 32. By positioning the OPOL crystal 34 as illustrated in FIG. 1, the OPOL crystal 34 is located within both the OPO resonator 22 and the laser resonator 20.

Additional elements of the FIG. 1 prior art OPOL system are a Q-switch 36 located in the laser resonator 20 between laser mirror 26 and OPO mirror 30, and an optical pump source 40 positioned to direct pump radiation at the OPOL crystal 34. An electronics unit 42 provides power and control signals to the Q-switch 36 and the optical pump source 40. The OPOL system is typically operated at atmospheric temperature, gas and pressure. When one of the output wavelengths is strongly absorbed by air, the OPOL system can be operated in a suitable non-absorbing gas in a manner known in the art.

The OPOL system shown in FIG. 1 is a self pumping non-linear optical device which operates as, and may be considered to be, both a laser and optical parametric oscillator. The OPOL system can produce coherent laser radiation at any wavelength in the electromagnetic spectrum at which the optical parametric oscillator can operate and can be tuned over that wavelength range.

In operation, the pump source 40 provides pump photons to the OPOL crystal 34. One basic element of both OPOL and OPAL systems is that the OPOL crystal 34, which consists of an optical parametric oscillator material, is doped with lasing ions which can undergo lasing transitions. In this manner, the OPOL rod acts both as a lasing medium and an optical parametric oscillator. As the pump photons are absorbed, the lasing ions are excited into a population inversion in the same manner as any conventional laser would. As lasing action begins, the laser photons oscillate between the laser mirrors 24, 26. When the laser photons reach a predetermined parametric threshold, some of the laser photons interact with the crystallographic structure of the OPOL crystal 34 to produce parametric photons, which are travelling at optical parametric frequencies. As long as the laser photon flux remains above the parametric threshold, parametric oscillation takes place between the OPO mirrors 28 and 30. The parametric threshold (and therefore the depletion rate of the laser photons from the OPOL crystal 34) can be controlled by varying the reflectivity of the mirror 28, which functions as a parametric output coupler. The OPOL system utilizes three wavelengths: The laser wavelength $\lambda_l$, a parametric signal wavelength $\lambda_s$ and a parametric idler wavelength $\lambda_i$. Depending upon the requirements of a particular application, one or more of these wavelengths may be extracted from the OPOL system in a manner well known in the art.

The laser resonator mirrors 24, 26 and OPO mirrors 28, 30 are important components of the OPOL system, and their characteristics vary depending upon the use of the OPOL system. In many OPOL systems, the laser resonator mirror 26 is a total reflector of all wavelengths of light utilized in the OPOL system. The laser resonator mirror can be flat or curved depending upon the cavity configuration. The laser resonant mirror 24 is an output coupler for the OPOL system, however it reflects most of the photons back into the cavity of the wavelengths $\lambda_s$ and $\lambda_i$; and it transmits virtually all of the photons of the wavelength $\lambda_l$.

However, in many other applications of the OPOL system, the mirror 24 reflects all of the laser energy but is transmissive at the laser wavelength and is a total reflector at one or more of the parametric wavelengths. The OPO resonator mirror 28 is an output coupler. Typically, the mirror 28 is 70%-80% reflective at one of the parametric wavelengths. However, in some cases, all or part of the other parametric wavelength is reflected by mirror 28.

The pump source 40 may be a flash lamp, a diode array or another laser for providing the necessary pump photons to the OPOL crystal 34. The pump radiation can be focused on the OPOL crystal 34 with a suitable lens arrangement (not illustrated) if necessary. The Q-switch 36 can be a rotating mirror, an acousto-optic switch, or any other suitable switching device known in the art. The electronics unit 42 provides electrical power to a pump source 40 and the Q-switch 36. Typically, the electronics unit 42 triggers the pump source 40 and then triggers the Q-switch 36 a few nanoseconds later to activate laser operation at a higher power (but with limited duration) than would occur without the Q-switch.

The OPOL crystal 34 is an important component of the OPOL system. The OPOL rod 34 is configured to produce both parametric oscillation and lasing action as described previously. Typically, the OPOL material is a crystalline substance which has demonstrated parametric oscillation and which is doped with an ion which undergoes lasing transitions in the crystalline matrix. The doped ion is usually a rare earth ion such as neodymium, samarium, holmium, or erbium; or alternately it may be metal ion such as chromium or titanium. The crystalline host material can be deuterated L-arginine phosphate (d LAP), beta barium borate (BBO), neodymium yttrium aluminum borate (NYAB), lithium niobate (LiNbO3), lithium borate (LBO), potassium titanium phosphate (KTP), potassium titanium arsenate (KTA) and other group IA metals (Rb, Cs), strontium barium niobate (SBN), polychalcogenide with non-centrosymmetric structures such as $K_2Hg_6S_7$, $Cs_2Hg_6Sc_7$ and $BaZnSnS_4$, or any other inorganic or organic material which has demonstrated parametric oscillation. The crystalline crystal 34 is cut with respect to the crystallographic optical axis to produce phase matching between the laser photons and the parametric photons at 1.084 $\mu$m (see T. Y. Fan et al., J. Opt. Soc. Am. B., Vol. 3, No. 1, January 1986, pp 140-147). The optical axis, when oriented at 46 degrees with respect to the Y-Z plane produces type 1 phase matching and thus parametric photons at 1.5 $\mu$m and 3.3 $\mu$m. Any specific figures used in this application are intended for illustration purposes only, and are not intended to be limiting in scope.

Even though the prior several paragraphs described the operation of an optical parametric oscillator laser (OPOL) system, it is to be understood that the above system can be utilized as an optical parametric amplifier laser (OPAL) system simply by modifying the configuration of the optical parametric oscillator in such a manner that it is an optical parametric amplifier, in a manner well known in the art (the three wavelengths $\lambda_s$, $\lambda_i$, and $\lambda_l$ only pass through the OPOL crystal 34 once instead of many oscillatory times as is the casein OPOLs). It is also noted that while the above OPOL and OPAL systems are illustrated as being one combined unit as illustrated in U.S. Pat. No. 5,195,104, it is within the scope of the present invention to utilize an OPOL being formed from a distinct optical parametric oscillator (OPO) portion and a laser portion. Similarly, it within the scope of the present invention to utilize an OPAL being formed from a distinct optical parametric amplifier (OPA) portion and a laser portion.

It is worth noting that devices using distinct OPA and laser units, and/or distinct OPO and laser units are not as light, not as energy efficient, and not as cost effective as the devices using OPOL and OPAL units. Devices using distinct OPO or OPA portions are also well known in the art.

OPOL and OPAL devices can be utilized in lidar and laser radar applications with combined size, weight and performance characteristics up to this time unobtainable. To use OPOL and OPAL as tunable sources for lidar is known, however, the use of OPOL as a source coupled to an OPAL as a receiver, with wavelength matching between the two parametric sources is not known. The various combinations of OPOL/OPAL also permits construction of numerous types of lidar remote sensors.

Figure 2:
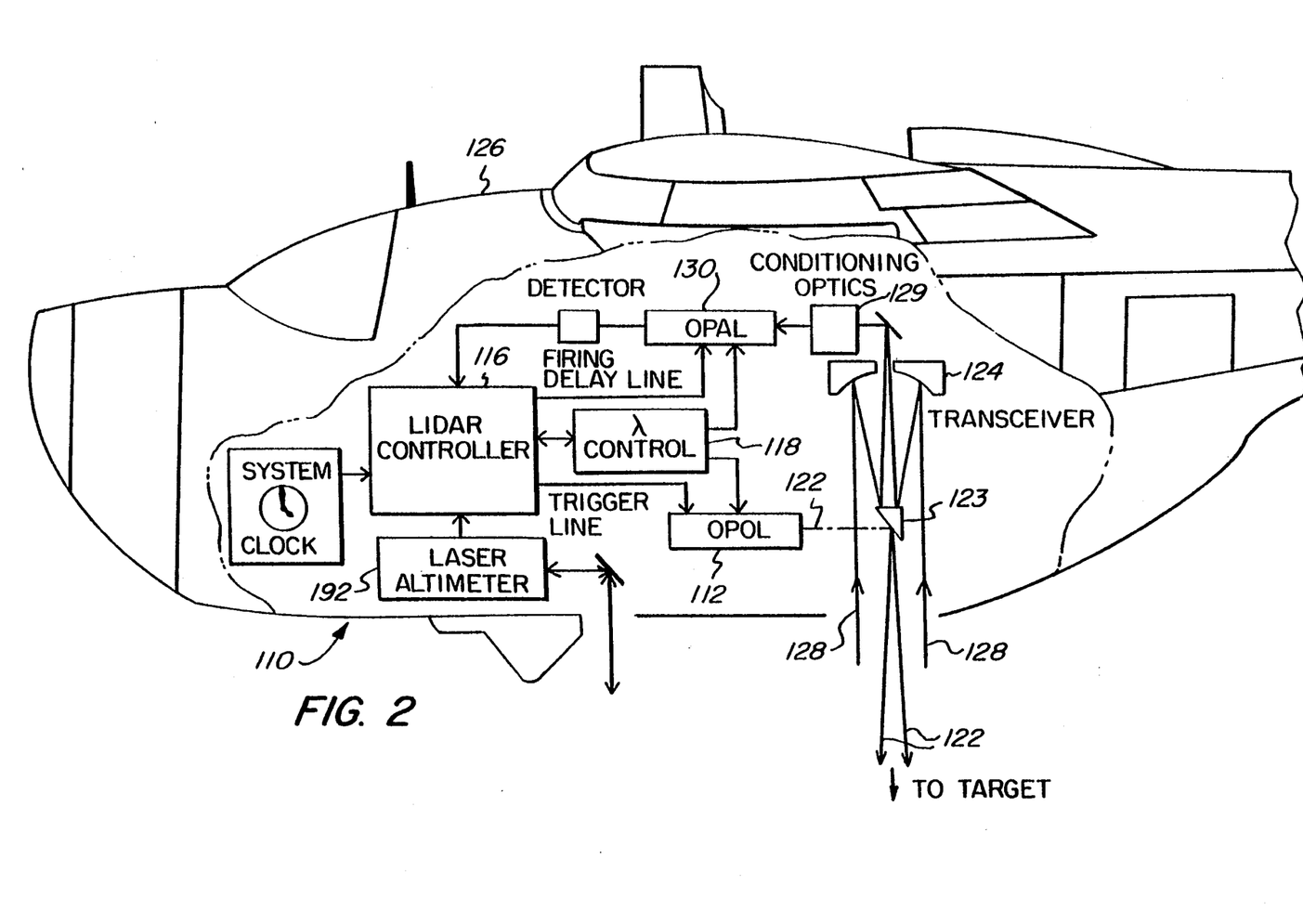
FIG. 2 illustrates a basic OPOL/OPAL lidar combination located in an aircraft according to one embodiment of the present invention.

A basic combined OPOL/OPAL lidar system 110 is illustrated in FIG. 2. An OPOL 112 (of the type described previously using OPOL crystal 34) acts as a tunable source which in this case is a DIAL system (differential absorption lidar) not shown. The OPOL output wavelength is controlled by a lidar controller 116 which feeds the desired wavelength (which is determined in a manner which is described later) to a wavelength controller 118. The wavelength of the optical signal generated by the OPOL 112 is determined by rotating of an OPOL crystal located in the OPOL relative to a pump element (not shown, but illustrated in U.S. Pat. No. 5,195,104). The pump element provides a population inversion to the lasing ions which were injected into the OPOL 112.

As soon as the OPOL crystal (not shown) is properly located relative to the pump element, then the lidar controller 116 sends a signal over a trigger line (the signal may be either electric or electronic), causing the OPOL 112 to be actuated. A coherent photon transmission signal 122 of the desired wavelength is then generated from the OPOL 112, via a transparent mirror 123 and a transceiver 124, out of the aircraft 126. It is noted that while FIG. 2 illustrates the aircraft 126 as the location for the OPOL/OPAL system, that lidar systems are often located in other vehicles as well as ground based system. The use of an aircraft, or any other such location in the present disclosure, is intended to be illustrative and not limiting. It is envisioned that the present OPOL/OPAL system may be utilized in any application which lidars and laser radars are being presently used in.

OPOL radiation, being made up of a plurality of photons which are coherent, is inherently polarized. Once the photon transmission signal 123 is reflected (from the ground, some other surface, or some other medium as is known depending upon the particular application) forming a radiation return signal 128 which is only partially depolarized. A portion of the radiated return signal 128 is collimated by the transceiver 124, and detected in an OPAL 130 after passing through a conditioning optics element 129. The elements of the above paragraph are located in the aircraft 126 (OPAL 130 is the same type as the OPAL described before which utilizes OPOL rod 34 in FIG. 1). The conditioning optic device 129 is used to place the photon return signal 128 in a condition which can be reliably sensed by the OPAL 130. The OPAL 130 in the OPOL/OPAL system 110 acts as a spectrometer in a manner known in the art, and the wavelength controller 118 causes the OPAL 130 to respond to, and amplify, only radiation of the desired wavelength and polarization as that produced by the OPOL 112, and whose phase matches the crystallographic axis of the crystal (not shown) of the OPOL 112. The OPAL 130 is necessary to act as an amplifier for the reflected radiation from the OPOL 112, since the returning signal should be relatively weak.

The OPAL 130 also up-converts the infrared radiation. For example, if a wavelength of 3.39 $\mu$m was being used to detect methane, then radiation of 3.30 $\mu$m (which is the corresponding idler radiation) would be amplified by the OPAL 130. However, this amplification also creates signal radiation at 1.6 $\mu$m which can be extracted from the OPAL 130 and detected only if the OPAL 130 utilizes non-cryogenically cooled detectors. In this fashion, an OPAL in the OPOL/OPAL lidar system performs the following functions:

a. acts as a tunable narrow band filter.
b. amplifies the incoming radiation.
c. up-shifts the radiation in wavelength to more readily detect radiation.
d. is gatable.

Previously, OPAs have not been used to up-convert radiation for such applications as illustrated in FIG. 2, largely due to the weight of the combined OPA and OPO units. The use of up-conversion for lidar systems is also known. However, the slaving of a tunable optical parametric source (such as an OPO or OPOL) with a tunable OPA or OPAL has not been shown. This is primarily because in the past, using an OPA in a receiver presented several problems which caused the OPA to be impractical for lidar applications. The first problem is that the OPA and the laser each require a separate pumping device. This would, in essence, cause the weight and complexity of the lidar package to be increased.

The second problem with using OPAs to up-convert radiation is that of OPA instability. As an OPA is pumped, whatever signal is to be amplified enters the OPA. As the parametric wave of the OPA increases in amplitude, the pump signal is depleted since the energy of the pump signal is used to produce the increased amplitude of the signal and/or idler wave. Because the OPA is a non-resonant device, as the pump is depleted, a level is eventually reached where parametric oscillation can no longer occur. The OPA thereupon turns off. However, as the OPA reaches, and remains in the vicinity of, its parametric threshold, the device rapidly turns on and off in an oscillatory manner (also known as flickering). Flickering causes not only a variable output, but also limits the gain of the OPA.

The advantage of both the OPAL and the OPOL is that they are simple, compact devices which permit the user to avoid the complexity and weight associated with the OPA and OPO process while permitting use of a resonant device (both OPOLs and OPALs contain resonant chambers). In the case of the OPAL 130, the instability is avoided since the device allows the resonant pump to come to equilibrium relative to the depleting parametric wave. By wavelength tuning the OPOL 112 to the same wavelength as the OPAL 130, using the wavelength control 118, a tunable hetrodyned lidar is effectively created.

Another advantage of the OPAL is the ability to adjust the OPAL's temporal response. The OPAL as discussed above, is a resonant device. The pump wavelength resonates within the cavity forming a beam waist. If the OPAL crystal is located at the pump beam waist, the OPAL will have an intermediate pulse length. This intermediate pulse length is a lidar time of flight window. For example, the OPAL is triggered 5 μsec after the OPOL has fired, the OPAL will then begin to see radiation backscattered to the lidar from 5 μsec×$C_=$/2. That is, the OPAL sees radiation backscattered from a range of 750 meters. The OPAL crystal is located at the beam waist and has a pulse length of 10 nsec, so the OPAL will amplify that radiation backscattered to the device between 750 m to 753 m. So, the OPAL can be triggered to accept radiation in 3 meter segments.

However, the crystal can be adjusted in the cavity by moving the crystal relative to the beam waist. The parametric resonant energy depletes the pump differently, allowing the OPAL pulse length to become longer, such as 100 nsec. Now the OPAL will observe a region of space 30 meters in depth.

If the crystal is moved far away from the beam waist, the OPAL operates in a true Q-switched region by reducing the overall pump depletion. The OPAL pulse duration becomes shorter, 5 nsec for example. Therefore, the OPAL observes radiation from regions with a depth of 1.5 meters.

Thus, the OPAL can be programmed to be range gated, but also have a variable range depth. This cannot be achieved by conventional OPAs.

Conversely, OPOL output characteristics can be controlled simultaneously. However, in practice OPOL outputs used will probably be as short as practical, and the OPAL depth of range used to look at regions of space for reasons of simplicity.

In the basic lidar, the narrow field of view of the OPAL is an advantage since it is ideal in reducing the noise floor of distant targets. The wide field of view of the distinct OPA is considered to be a disadvantage. Both the OPAL and the OPA acts in the spatial domain for travelling waves, with the gain length being dependant upon the field of view.

Another advantage of the OPAL over the OPA is that it is a resonant device. Since it has a gain length dependant on the field of view, the field of view is directly constrained by the pump divergence and the phase and group velocity walk-off. That is, the resonant pump in the OPAL multiplies the effective gain length by the number of passes it makes in the resonant chamber of the OPAL which depends upon the cavity length (12 cycles for a 10 nsec cavity length). This results in the OPAL being many times more efficient than the OPA, partially considering that the OPAL does not suffer from the OPA's limitations due to instability, and also the OPA's inherent complexity in design.

In the OPOL/OPAL lidar 110 of the present invention as illustrated in FIG. 2, the OPOL 112 and the OPAL 130 are wavelength locked through a controller 116 which utilizes a wavelength controller 118 which coordinates the crystals of the OPOL 112 and the OPAL 130, respectively. The radiation to be amplified which was transmitted by the OPOL 112 is delayed in time by a period required for light to leave the OPOL 112, strike the ground or target, and return to the OPAL 120. A laser altimeter 192 is used to determine the height above ground or target of the aircraft, and the altitude to be input into the controller 116, which is used to determine the phase delay required for the OPAL with respect to the OPOL.

It should be emphasized that the OPOL 112 and the OPAL 130 utilize three frequencies (the idler and signal frequencies of the OPO, as well as the pumping frequency produced by the laser to pump the OPOL crystals of the OPOL 112 and the OPAL 130). An OPO and a OPA can only operate over two frequencies, while a laser is limited to operate over one frequency. This is an important point in the present invention since it is desirable to produce a system which can be tuned over as many frequencies as possible.

Figure 3:
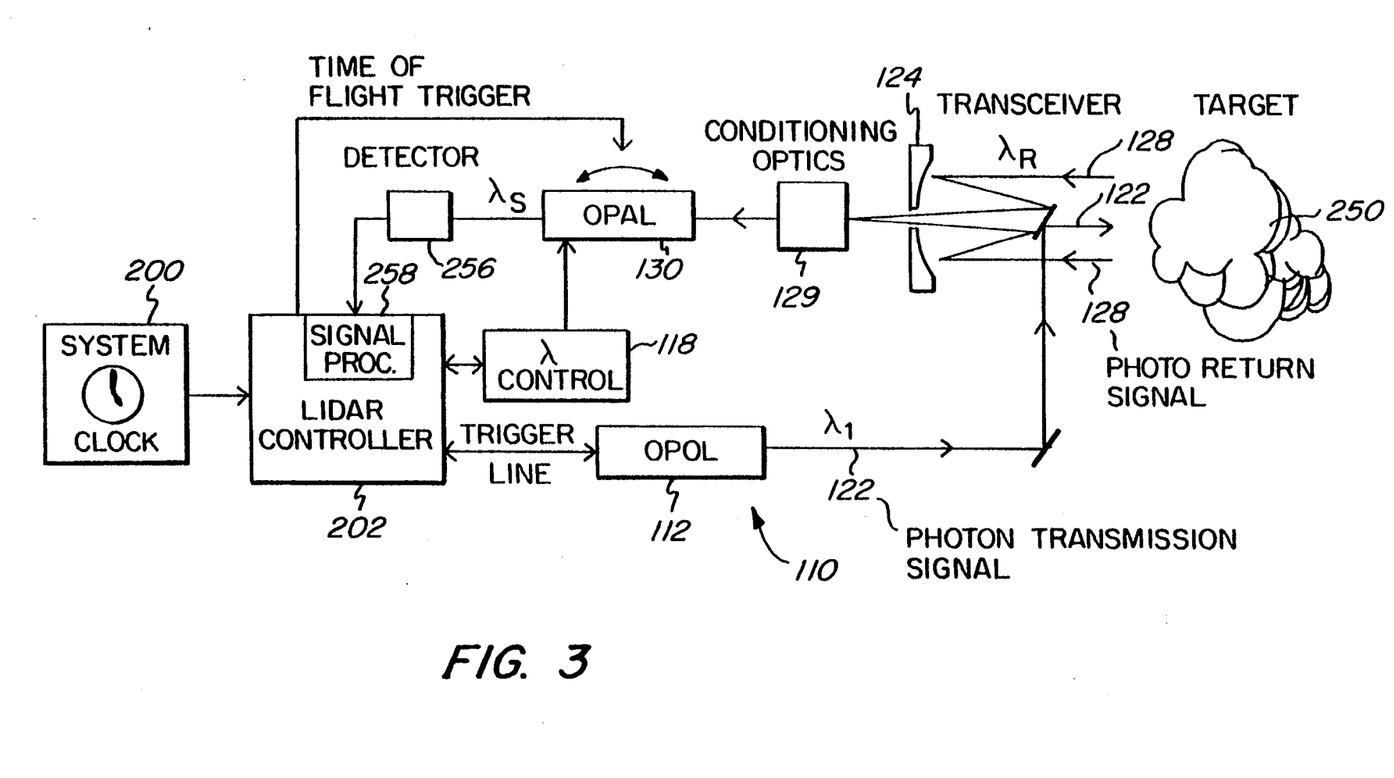
FIG. 3 illustrates another embodiment of OPOL/OPAL lidar combination used to sense atmospheric backscatter using Raman scattering according to another embodiment of the present invention.

In the case of atmospheric backscatter lidar as illustrated in FIG. 3, a lidar system clock 200 would control the OPAL 130 firing through the lidar controller 202. This is accomplished by the time control being sequenced with the firing of the OPOL 112 to take "time slices" of the sent pulse (from the OPOL) in space. For example, if the OPOL/OPAL device 110 has pulse widths of 10 nsec, the resolvable depth is 3 meters. If the OPAL is fired 10 μsec after the OPOL 112, then the device 110 would receive an atmospheric return 3 meters in depth at a distance of 1.5 km. By sequencing the OPAL 130 relative to the OPOL 112, a range profile from the lidar out into the atmosphere is produced.

A significant advantage to this feature is noted when one considers that the OPAL 130 is acting as a gatable shutter in the FIG. 2 configuration [which is a schematic representation of the previous paragraph]. In most present atmospheric lidar situations, the atmospheric backscatter is very strongly scattered in the vicinity of the lidar, and reduces in a decaying exponential fashion as the target is located further away from the source. This requires the detector and electronic amplifier to operate over an extremely wide dynamic range which often saturates the detector and/or reduces the sensitivity of the lidar over the longer ranges. By using the OPAL 130 as a gatable shutter, this situation is avoided.

The use of an OPAL 130 as a receiver in a lidar greatly increases the flexibility of the lidar while reducing the weight and size of the lidar. The OPAL 130 is sensitive to the polarization plane of the backscattered radiation which it receives. An application of the combined OPOL/OPAL lidar utilizing enhanced Raman scattering is illustrated in FIG. 3. This device operates on the principle that photons forming the light beam emitted from the OPOL will maintain the polarization plane of the OPOL 112 as the photons travel through the air and is deflected by the target. In the FIG. 3 lidar, the OPOL 112 is used as a source of polarized radiation. Although FIG. 3 illustrates the use of an OPOL 112 as the light source which produces photon transmission signal 122, any laser or light source may be used which produces polarized radiation. The polarized radiation of the photon transmission signal 122 is transmitted to target 250 which is of the type which produces Raman scattering. The wavelength shifted scattering which is in the same polarization plane as produced by the OPOL 112 is collected and collimated and directed to the OPAL 130.

Since the Raman scattered radiation is wavelength shifted, the OPAL 130 is tuned to a different frequency from that being produced by the OPOL 112. The OPAL may be tuned to seek numerous Raman scattered wavelengths, or, if a particular compound is being considered, the OPAL 130 will be operated at a fixed wavelength. The amplitude of the photon return signal 128 is then sensed by a detector 256 which quantizes and filters the photonic signal received by the OPAL 130 in a known manner. The output of the detector 256 is then input to a signal processing portion 258 of the lidar controller 202. In a remote sensing mode, the OPAL 130 will have to be delayed triggered similarly to the previously described differential scattering lidar.

One of the primary advantages of the OPAL enhanced Raman sensor is that it can operate very effectively where the OPAL 130 senses photon return signals 128 which are in the infrared region. Previously, prior art infrared Raman systems were not used in lidar applications because the scattering efficiency is reduced by an amount proportional to the fourth power of the wavelength of the signal. For example, when shifting from an exciting wavelength of 800 nm to 1600 nm the resulting Raman signal is reduced by a factor of 16, which explains why this has not been used previously.

However, OPAL systems can operate very efficiently in the infrared region and can amplify the Raman signal by a magnitude of 10 4 or 10 5. Since OPAL amplification is wavelength specific, much of the background noise is eliminated. Also, because the excitation source (OPOL 112) is in the infrared, florescence background is limited.

The method of Raman scattering illustrated in FIG. 3 is applicable to straight Raman scattering, coherent anti-stokes Raman spectroscopy (CARS), stimulated Raman emission (SRE), and all other forms of Raman scattering where the scattered radiation retains its polarization.

Figure 4:
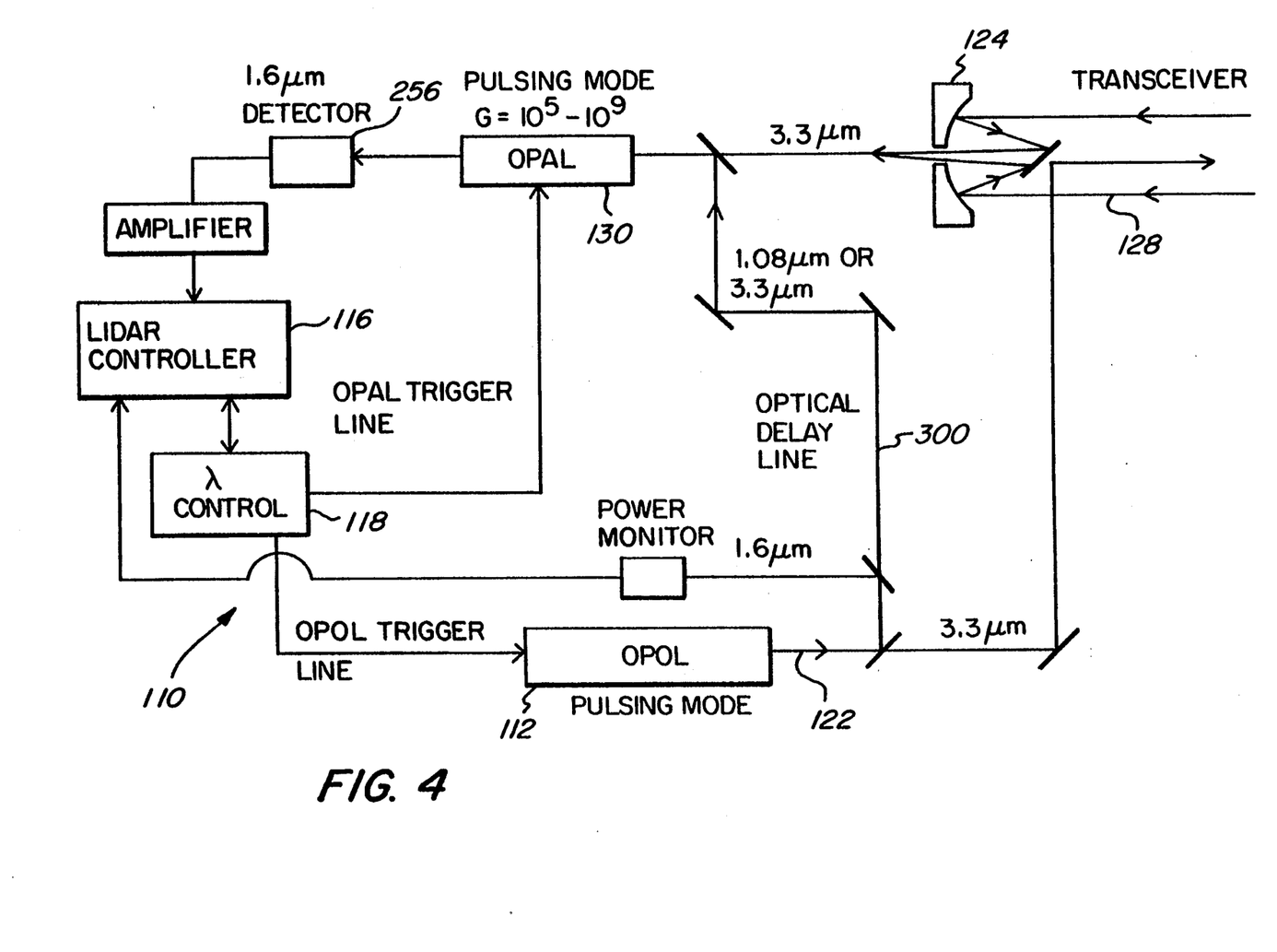
FIG. 4 illustrates yet another embodiment of OPOL/OPAL lidar combination using heterodyning to enhance detection sensitivity.

FIG. 4 illustrates the application of heterodyning to the present system. The use of heterodyned techniques to increase detection sensitivity is known. Heterodyne detection offers spatial filtering due to the antenna like characteristics of the detector. It has been illustrated that the effective aperture of a heterodyned detector is $A_r \sigma_r \approx \lambda^2$ where $A_r$ is the diameter of the receiver aperture and $\sigma_r$ is the receiver solid angle. However, the cost and complicated nature of tunable coherent sources have limited the application of heterodyne detection.

Due to the unique nature of the combined OPOL/OPAL system 110, a relatively simple heterodyned lidar system can be constructed. The heterodyned system uses one of three wavelengths generated by the OPOL 112 (the pump, signal and idler) as a seed or wavelength lock on the OPAL 130. There are several methods which accomplish this. One method is to double pulse the OPOL. The lidar controller 116 sets the wavelength of both the OPOL 112 and the OPAL 130 and fires the OPOL which transmits photonic radiation of the desired frequency which in many applications is often approximately 3.3 μm (these values are intended to be illustrative and not limiting). Similar to the time multiplexed dial lidar of U.S. Pat. No. 5,157,257 issued to Geiger, and incorporated herein by reference, the OPOL 112 is fired again after a delay of 2 d/c where c is the speed of light, and d is the distance between the OPOL/OPAL and the target. This d is determined by the electronic temporal resolution of diode firing circuitry that can be obtained reliably (0.5 μsec or longer). The pump frequency produced by the lasing ions in the OPOL crystal of the OPOL 122, or one of the parametric wavelengths of the OPOL 112, is used as a seed for the OPAL 130. Detection of the photonic radiation utilizing the photon return signal 128 utilizes identical elements and functions as those illustrated and described in the FIGS. 2 or 3 embodiments.

In the lidar described in the prior paragraph, a wavelength lock between the OPOL 112 and the OPAL 130 result from two distinct OPOL temporal pulses from the OPOL, one which is used to seed the OPAL. However, the OPOL/OPAL can be constructed to further enhance the heterodyne lock. This is because both OPOLs and OPALs can be operated in a pulsing mode similar to as is commonly known for typical lasers. In a pulsing mode, the OPOL will transmit a signal which consists of a plurality of pulses, each signal formed from smaller pulses. This phenomenon has been previously observed in internal cavity doublers and in internal cavity OPOs.

While it is true that the wavelength controller 118 sets the wavelengths for both the OPOL 112 and the OPAL 130 of the OPOL/OPAL lidar 110, it is noted that the OPOL 112 has a distinct beat frequency. The beat frequency is composed of a fundamental series of pulses, and the parametric pulses are composed of a series of pulses. In lidar systems, the desired parametric wavelength is transmitted into the atmosphere. However, some of the fundamental or any of the parametric wavelengths are selected by the OPOL. For this example, if a fundamental frequency at 1.0 μm is used. The small amount of energy contained in the fundamental frequency usually is smaller than 1 percent of the total resonant frequency contained in the OPOL. The photonic energy at the fundamental frequency is transmitted through an optical delay line 300. In the FIG. 4 embodiment, the optical delay line 300 has a constant delay. In the FIG. 5 embodiment, the delay period of the optical delay line 300 may be varied using a variable delay device including a long spool of fiber optical cable 306 which is coupled to a liquid crystal switch 307 (typically arranged in an array). The optical delay line 305 in the FIG. 5 embodiment functions in a similar manner as a varistor, except that extending the active length of the spool of fiber optical cable acts to increase the delay time instead of the resistance (as would be the case with a varistor).

Figure 5:
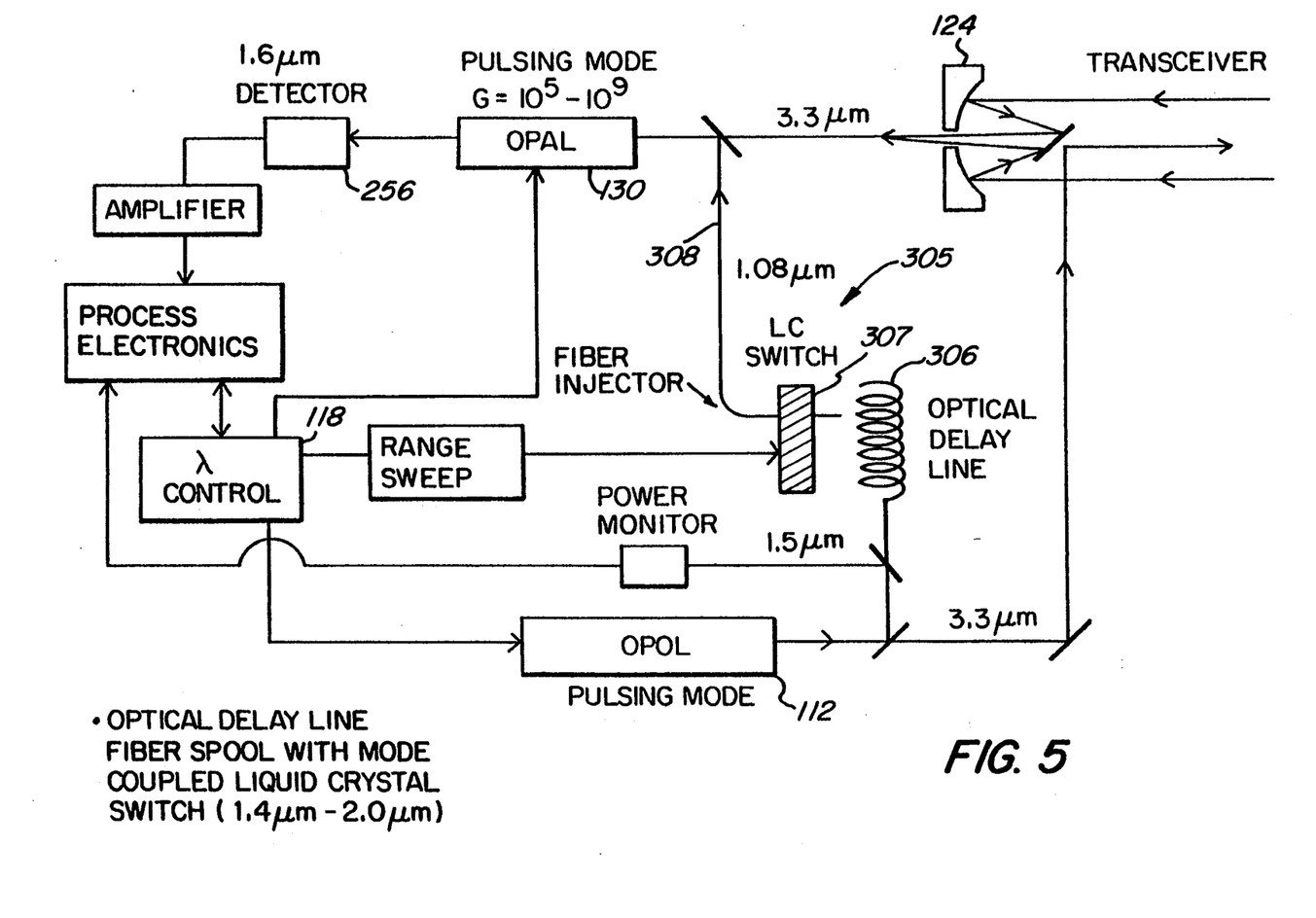
FIG. 5 illustrates another embodiment of OPOL/OPAL lidar using a homodyned system.
Figure 6:
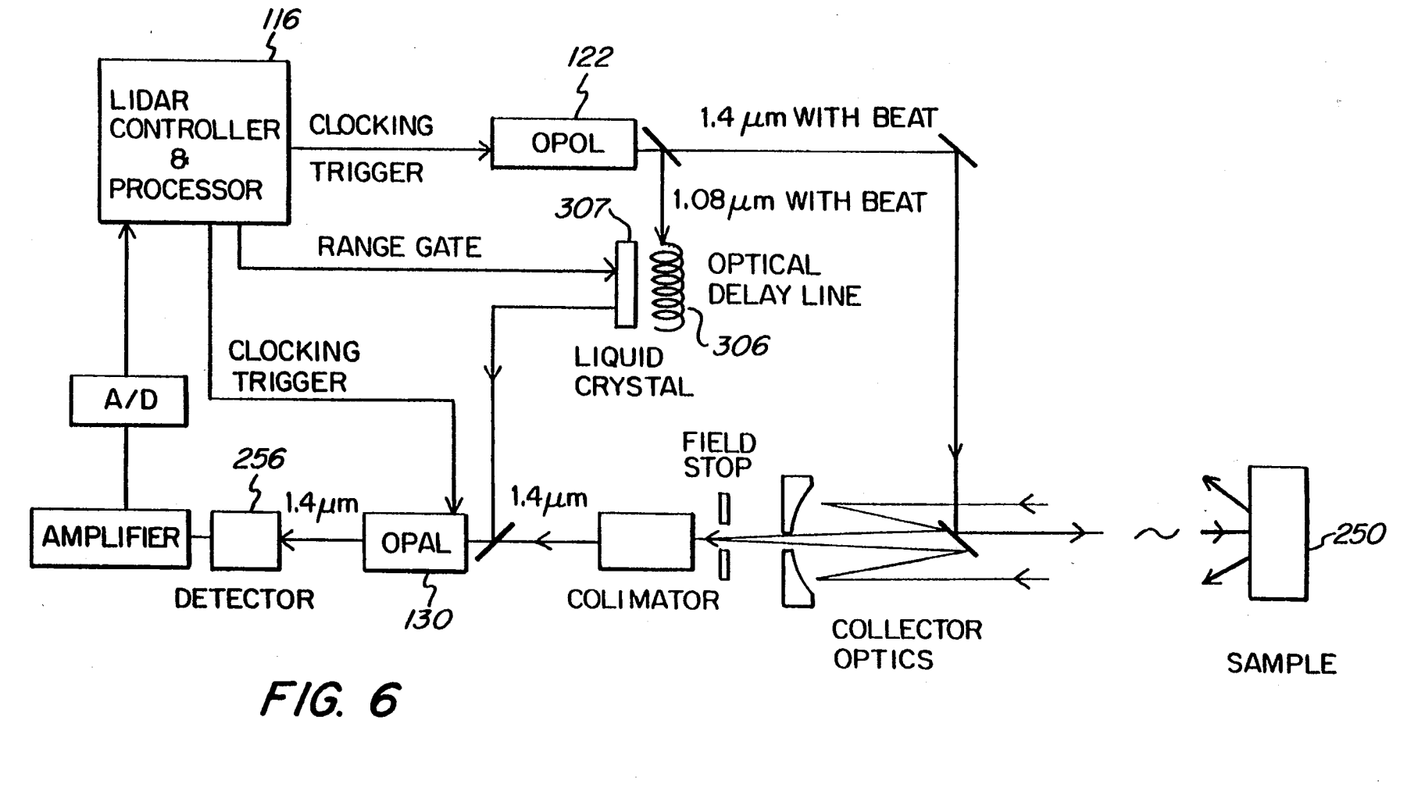
FIG. 6 illustrates still another embodiment of OPOL/OPAL utilizing a combined homodyned and Raman systems.

By addressing the appropriate liquid crystal element, a specific distance that the pulse has travelled in the spool 306 can be read off the spool. This pulse is then mode coupled into another fiber line 308 which is fed into the OPAL 130. When the arrival of the pulse corresponds with the arrival of the radiation which has passed through the transceiver, and has reflected off, or passed through the target; the amplitude of the returning radiation will be at a maximum, and the distance to the target can be calibrated based upon the calibration of the optical delay line 305 with the embedded spool 306 and the liquid crystal switch 307. The pulse returning from the optical delay line 305 then seeds the OPAL 130 to set up the optical beat frequency of the OPOL. The OPAL 130 then amplifies the signal corresponding to the beat frequency.

A unique feature of the OPOL/OPAL lidar is that the seed beat and the received beat frequencies do not necessarily have to be associated with a transmitted wavelength. For example, a heterodyned Raman lidar could be constructed using the same principle as a DIAL lidar as described above. The lidar controller sets the OPOL wavelength and then fires it. The Raman probing wavelength with a beat frequency is transmitted to the sample, which Raman shifts the wavelength of.

The above technique which uses the OPOL/OPAL beat frequency can be used for any lidar application where the beat frequency is imposed on the returning radiation which is in the correct polarization to permit polarization by the OPAL. One unique feature of this embodiment is that the beat frequency is tied to three wavelengths (fundamental, signal and idler), either of which can be used as a probe frequency or a seed frequency. This, in turn, ties any of the three to another wavelength which may be generated by any of the three wavelengths.

Figure 7A:
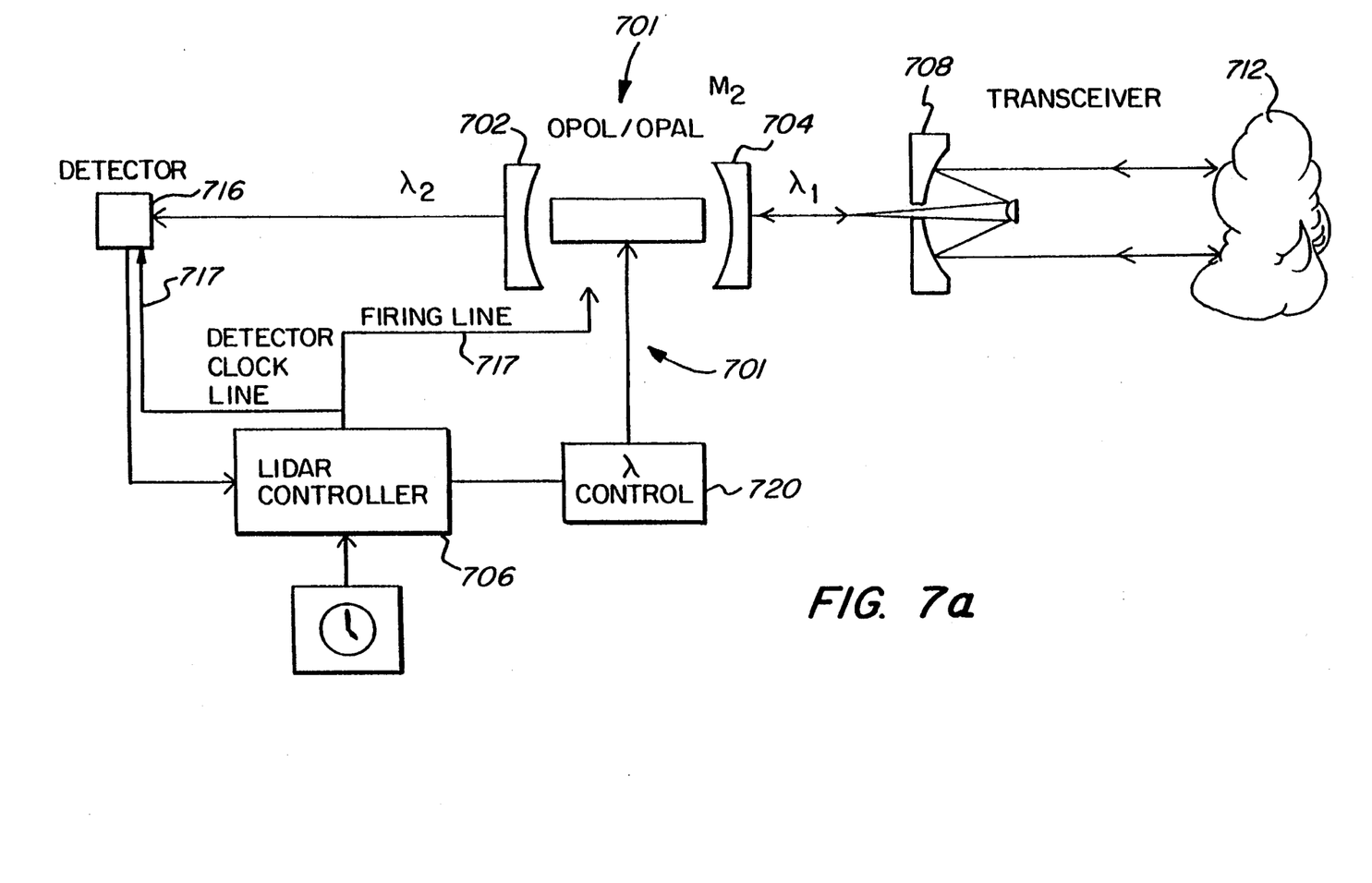
FIG. 7a illustrates one embodiment of an OPOL/OPAL system where time multiplexing is provided to enable the OPOL and OPAL units to utilize the same OPOL crystal.

A time multiplexed lidar is illustrated in FIG. 7a, which permits use of a common OPOL/OPAL portion 701, which contains only one OPOL crystal 700. The OPOL crystal is used to send and receive signals relating to the three frequencies. The OPOL resonates at a pump wavelength which may be up-shifted. For example, the 1.4 μm to 2.0 μm region ($\lambda 2$) is resonated and 100 percent of the 3.0 μm to 4.0 μm region ($\lambda 1$) is coupled out of (permitted to pass through) the OPOL. In this case, mirror 702 reflects 100 percent of the photonic radiation with wavelengths of $\lambda 1$, and transmits 20 percent of the photonic radiation with wavelengths of $\lambda 2$. Mirror 704 is an output coupler and transmits all of the radiation from $\lambda 1$ which is produced from within the OPOL crystal and is directed towards the transceiver 708 (it is antireflection coated), but is 100 percent reflective of similarly directed photonic radiation of $\lambda 2$.

A lidar controller 706 tunes the OPOL wavelength by rotating the OPOL crystal 700 or by setting an acousto-optical or electro optical frequency (or by other well known means of controlling a wavelength of radiation transmitted from an OPOL crystal). The controller causes OPOL pump frequency radiation ($\lambda 1$) to be generated within the OPOL crystal 700, and OPOL action occurs. The $\lambda 1$ photonic energy is then extracted from the OPOL crystal 700 through mirror 704, and transmitted by a transceiver portion 708 to and from the target 712; the transceiver portion 708 acts similarly to the transceiver 124 of FIG. 1. As the OPOL crystal 700 is fired, radiation of $\lambda 2$ frequencies are transmitted through mirror 702, which are not detected (because a detector 716, which is any well known type of photodetector, is turned off at this time due to an impulse from the lidar controller 706 to electrical conductor 717). The generated $\lambda 1$ wavelength (which is sent in a pulsed OPOL configuration) is transmitted out to a target 712 and is so back to the transceiver 708. The photonic radiation which is being sent and returned has a time of flight of 2 d/c where d is the distance which photonic radiation travels from the OPOL crystal 700 to the target 712. At a specified time of 2 d/c after radiation originally left the OPOL crystal 700, a range cell of photonic radiation $\lambda 1$ (at a reduced intensity) enters the OPOL.

The lidar controller 706 has the capability of altering the operation of the OPOL/OPAL portion 701 such that it can function either as an OPOL, as previously described, or as an OPAL by double pulsing the OPOL. When the $\lambda 1$ photonic radiation is returning to the OPOL/OPAL portion 701 after reflecting from the target, the lidar controller is causing it to act as an OPAL by pulsing the OPOL again at some time t after the first pulse. After the $\lambda 1$ radiation enters into the OPOL crystal 700, a predetermined portion of the radiation is converted via parametric amplification (OPA) into $\lambda 2$ radiation, and the $\lambda 2$ photons pass through mirror 702 which may be detected by a detector 716 (which at this time is turned on by the lidar controller 706). The number of $\lambda 2$ photons entering the detector 716 is thereby directly proportional to the number of $\lambda 1$ photons entering the OPOL/OPAL portion 701 after being reflected off the target.

The process outlined in the prior paragraph may be repeated at different frequencies by controlling the $\lambda$-controller 720, which is regulated by the lidar controller 706. This permits photonic radiation of different $\lambda$ values to be transmitted and received from the OPOL/OPAL portion 701, to sense different elements or conditions in the atmosphere. By time sequencing the OPOL/OPAL portion 701, a variety of ranges of wavelengths may be used.

Figure 7B:
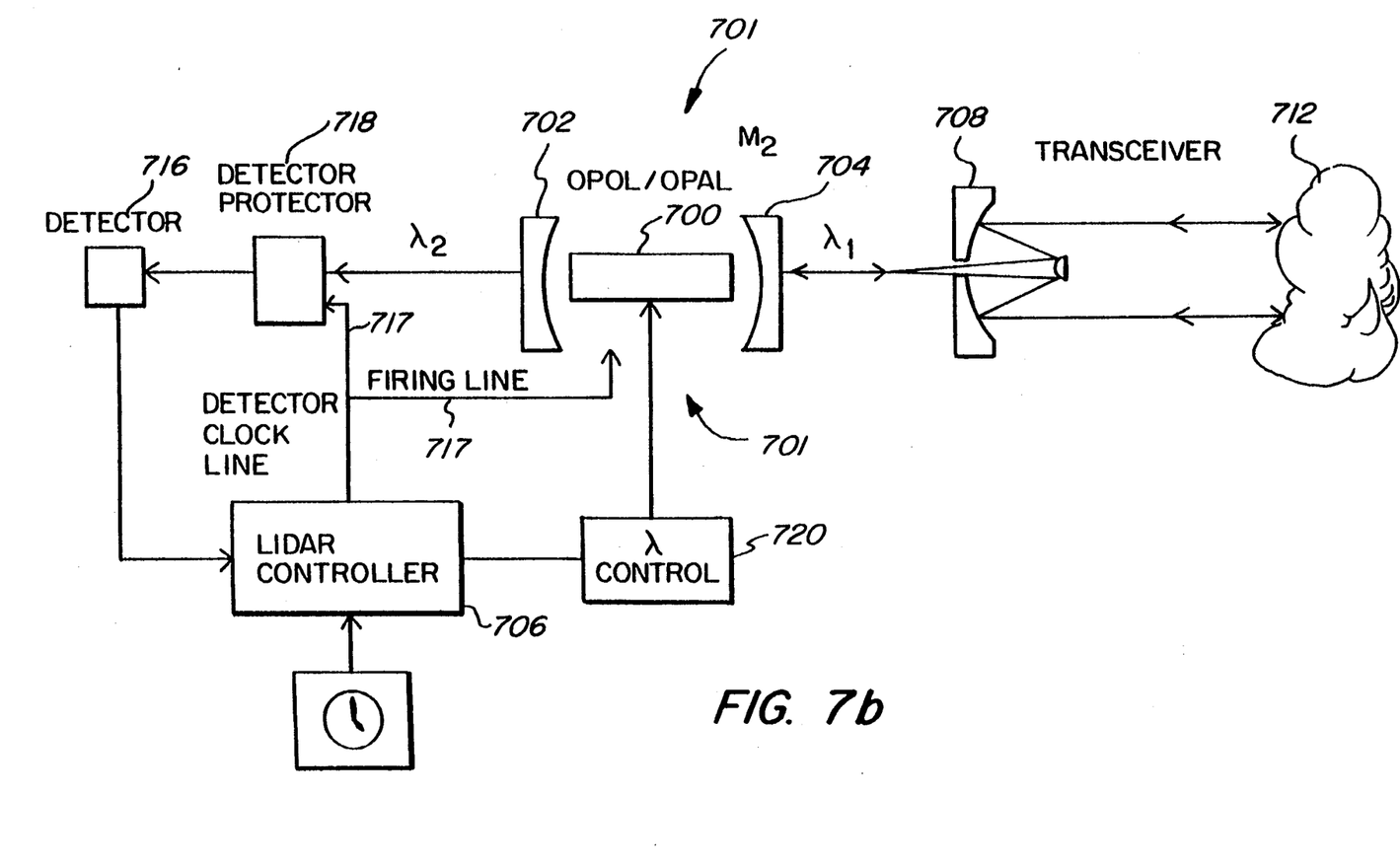
FIG. 7b illustrates a second, but similar, embodiment of an OPOL/OPAL system from that illustrated in FIG. 7a, which incorporates a detector protector 718 which functions with the detector 716.

In the embodiment illustrated in FIG. 7b, the photodetector 716 is left on all of the time, however a photodetector protector 718 either blocks virtually all of the $\lambda 2$ radiation to the photodetector 716 (when the OPOL/OPAL portion 501 is acting as an OPOL); or else permits virtually all of the radiation to pass to the photodetector 716 (when the OPOL/OPAL portion is acting as an OPAL). The detector protector may be a mechanical device (such as an electro-mechanical shutter), or else it may be an optical device (such as a birefringent crystal or liquid crystal display). Since the radiation being emitted from the OPOL crystal 700 is polarized, alternately any polarizing based optical element may be used.

Figure 8:
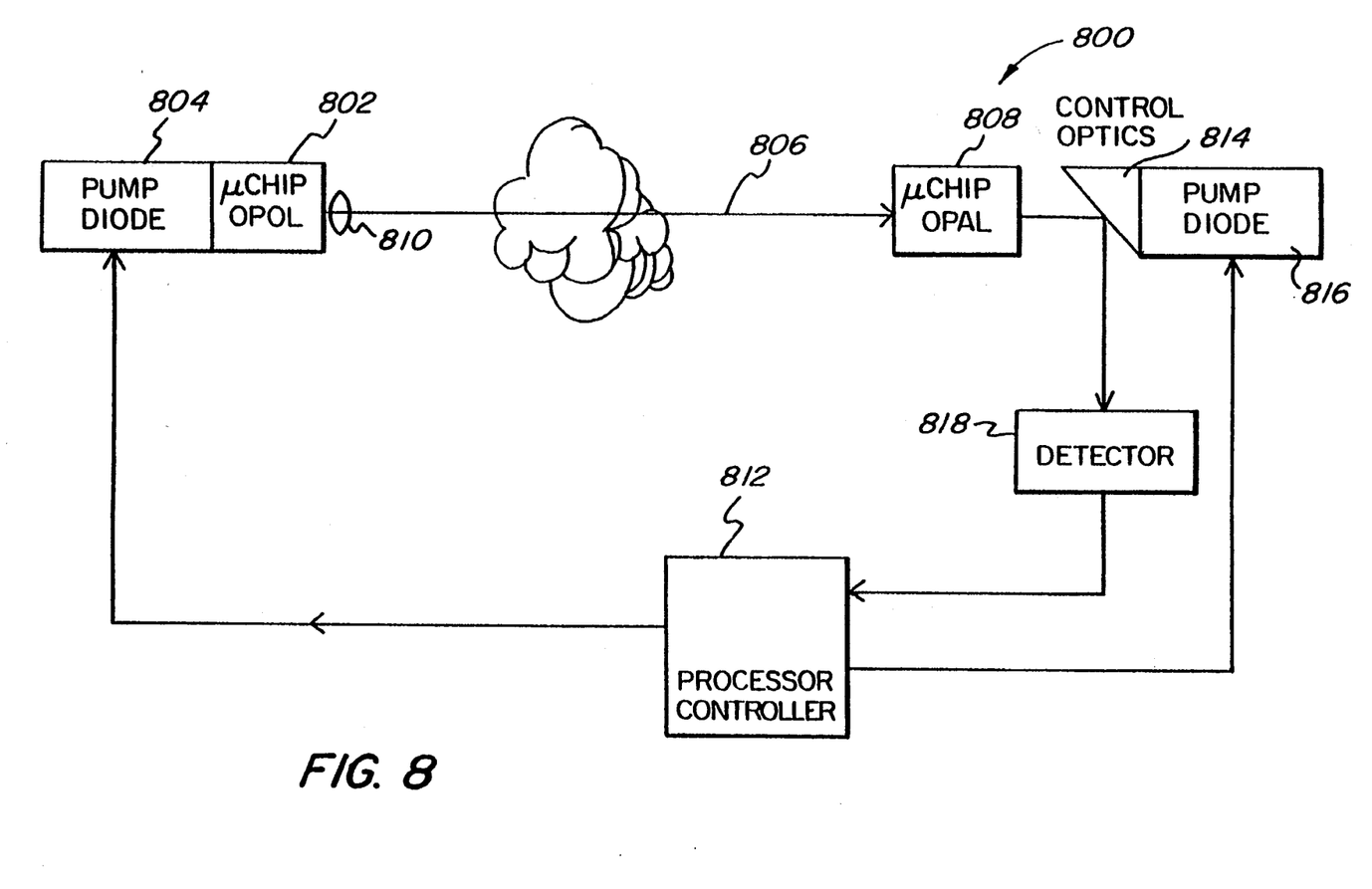
FIG. 8 illustrates an OPOL/OPAL lidar system in which the OPAL and OPOL elements are formed from microchip construction.

FIG. 8 illustrates another embodiment of the present invention utilizing a microchip based OPOL/OPAL device 800. This embodiment allows for the construction of miniaturized lidar or laser radar to be operated in the fashion similar to the larger scale lidar or laser radar, as previously described. Being able to use a microchip OPOL as a tunable source has a number of advantages (size, weight, power), and would permit a relatively sophisticated system to be inserted in many new applications where the listed advantages are applicable. In addition, the construction of an microchip OPOL/OPAL device 800 would permit the construction of sensors using OPOL/OPAL technology in integrated photonic circuit configurations, which would not be permitted with the prior discrete OPOL/OPAL embodiments.

In FIG. 8, a microchip OPOL 802, which is pumped by a pump diode 804, discharges a collimated beam 806 which is directed to be detected by microchip OPAL 808. In order to maintain the beam from the microchip OPOL 802 in a narrow configuration, a lens 810 may be inserted between the OPOL and the OPAL, and closely adjacent the OPOL in a manner known in the art. Similar to the previous lidars, a processor controller 812 (which typically has a variable delayed trigger) controls the wavelength of the radiation emitted from the pump diode 802 such that the OPOL may be tuned to generate photonic radiation at a desired frequency. The selected wavelength is amplified by the microchip OPAL 808 in a similar manner to as previously described after it has reflected from, or been transmitted through, the target. The microchip OPAL has all of the advantages of the lidar OPAL in that it is an amplifier, it is gatable, it has a narrow field of view, and it is upshiftable. After the photonic energy has been passed through the microchip OPAL (and optical parametric radiation results), the optical parametric radiation is reflected off a variable control optic source 814 (as controlled by pump diode 816, and the intensity of the radiant photonic energy is measured by a photodetector 818.

Figure 9:
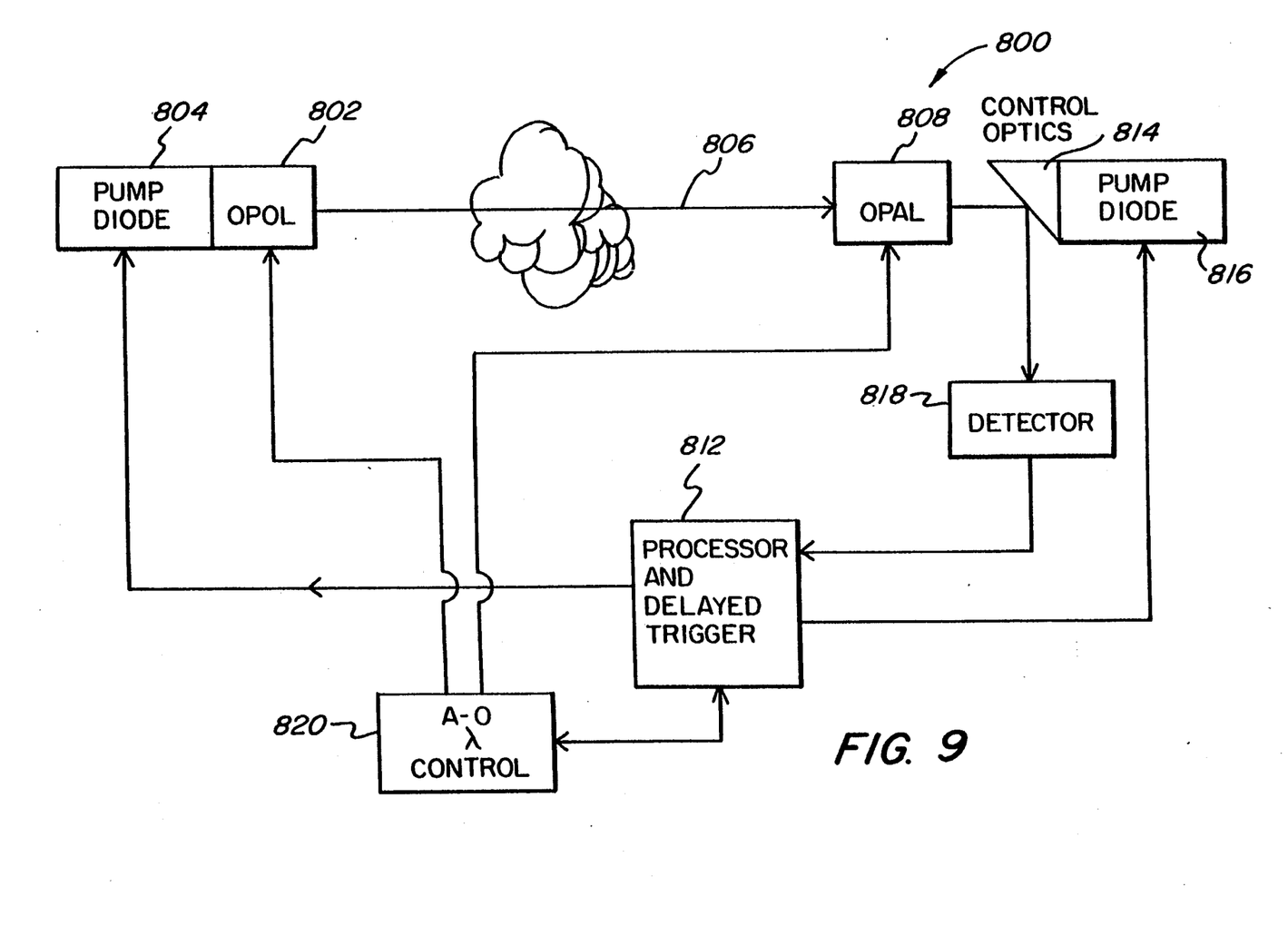
FIG. 9 illustrates another microchip OPOL/OPAL lidar wherein the wavelengths of the OPAL and the OPOL are frequency agile.

In the simple microchip OPOL/OPAL sensor 800 illustrated in FIG. 8, the integration of the detector 818, microchip OPOL 802, and pump diode 804 is accomplished through the control optics which use dichroic/-trichroic coatings to detect the various wavelengths where tunability is required. FIG. 9 illustrates an identical OPOL/OPAL sensor configuration to that illustrated in FIG. 8, which provides a wavelength controller, to control the parametric oscillation wavelengths which the microchip OPOL 802 and the microchip OPAL 806 are operating at.

Figure 10:
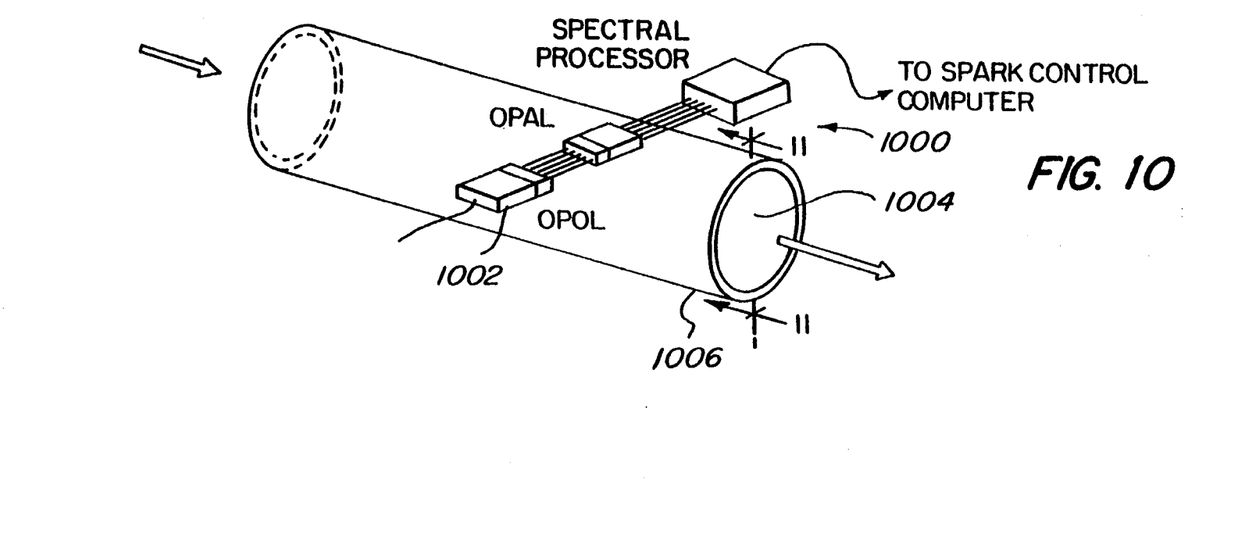
FIG. 10 illustrates a OPOL/OPAL configuration which is utilize to sense emissions from an automobile.
Figure 11:
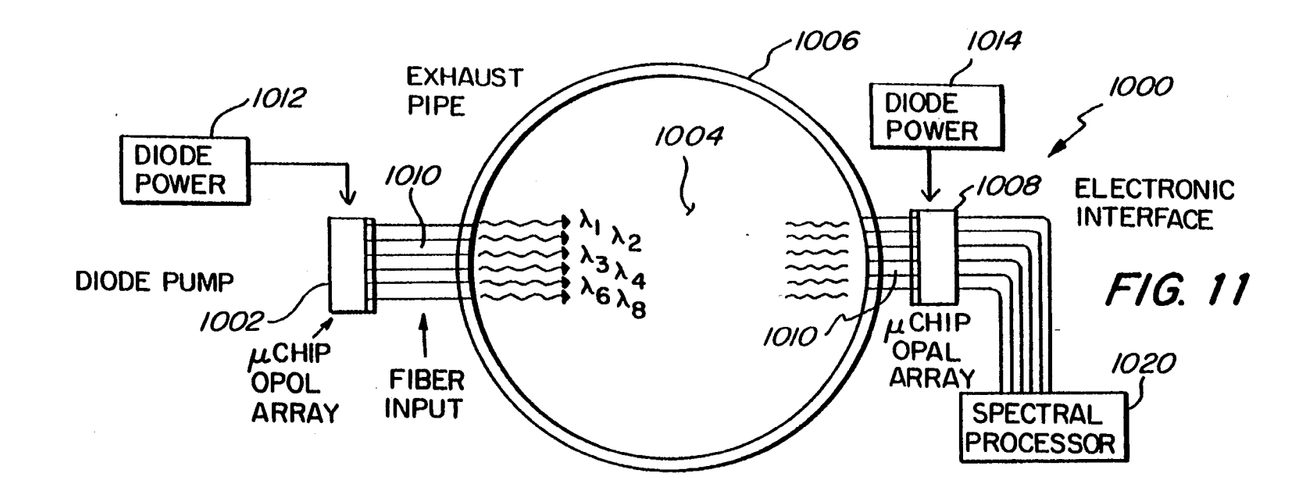
FIG. 11 is a view as taken along sectional lines 11—11 of FIG. 10.
Figure 12:
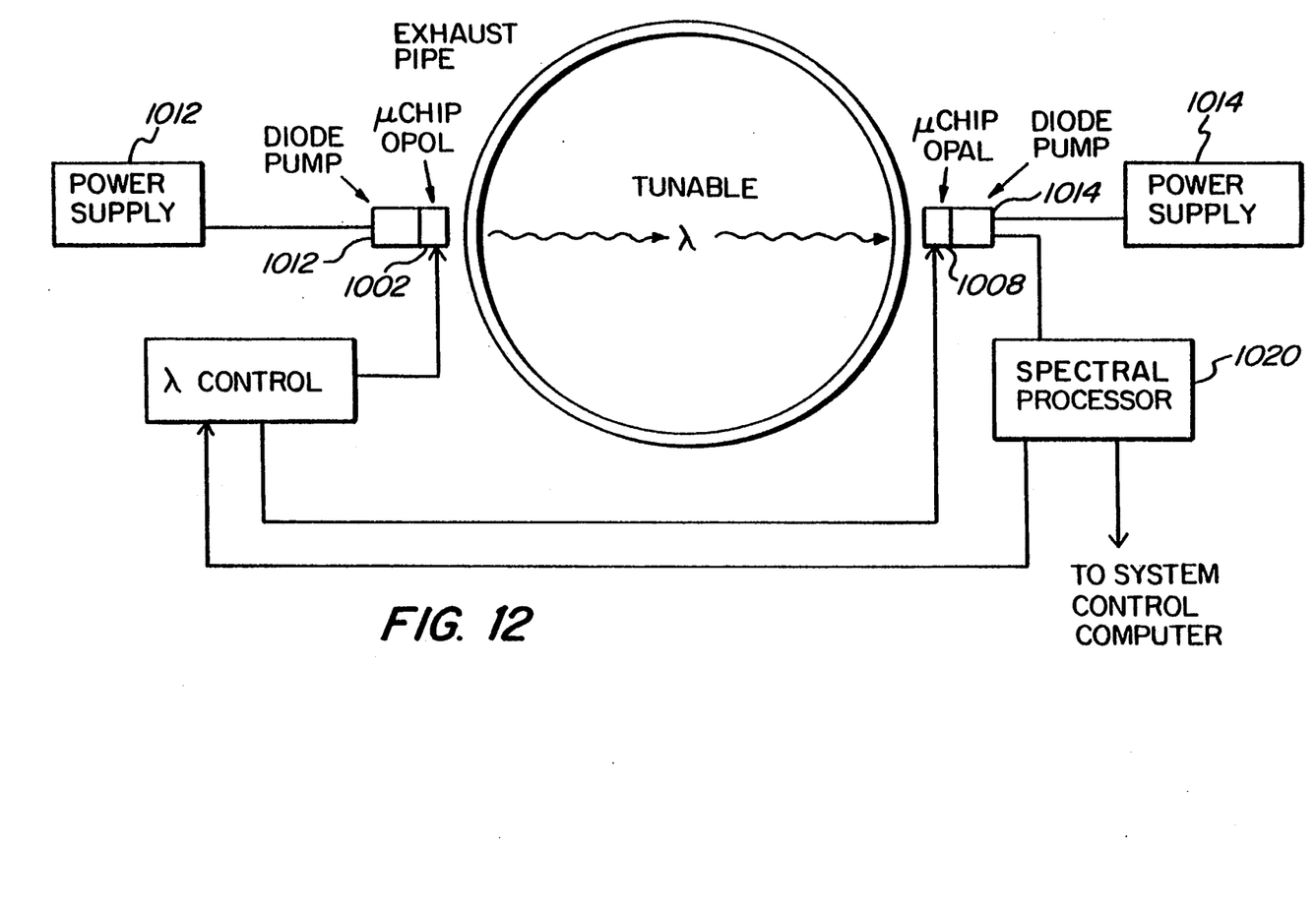
FIG. 12 is an alternate OPOL/OPAL emission sensor which has enhanced tunability.

By integrating the microchip OPOL/OPAL systems as illustrated in FIGS. 8 and 9, miniaturized optical sensors can be built. Due to their size and cost, microchip OPOL/OPAL arrays would become relatively feasible and cost effective. FIGS. 10 and 11 illustrates an array microchip process sensor 1000 which may be used (for example) in an automotive emissions sensor, in which an OPOL array 1002 is arranged to transmit photonic radiation towards the target (which in this case is the compounds located in the emissions 1004 located within pipe 1006. The compounds which would most likely be sensed in the automotive emission application include total hydrocarbons, the nitrogen oxides, and carbon monoxide. Similar to a DIAL lidar, for each chemical species to be measured, a pair of wavelengths is used, one on the absorption feature and the other off the spectral feature. The OPOL array emits the appropriate wavelengths and a microchip OPAL array amplifies 1008 (mounted closely adjacent the pipe 1006) and detects these wavelengths. Fiber optic members 1010 are used to transmit the photonic radiation from the OPOL 1002 to within the pipe 1006, and from within the pipe to the OPAL 1008 in a manner well known in the art. Diode power sources 1012 and 1014 supply power to the microchip OPOL 1002 and OPAL 1008, respectively. A spectral processor 1020 determines the quantity of the photonic radiation of different wavelengths which are exposed to the OPAL array 1008.

Since many of the wavelengths lie in the mid-infrared frequency range, the OPAL up-shifts the mid-infrared into the near-infrared. In the case of an automobile emissions sensor, this is critical for two reasons. First, the detection of mid-infrared radiation must be accomplished by cryogenically cooled detectors which cannot be maintained in a system which practically must be operated without outside support. Second, the up-shifting to the near-infrared allows the usage on non-cooled communication type diode detectors (which are relatively inexpensive).

It should be emphasized that while the figures illustrated the OPOL/OPAL combinations in different applications such as lidar, laser radar, vehicular emission testing, among others. that the important feature of each of the figures is the specific configuration of the OPOL/OPAL members and the associated elements. It is envisioned that many of the embodiments which are applied to lidar could be equally well applied to laser ranging and vehicular emissions or others without departing from the scope of the present invention, and vice versa. Therefore, the specific applications described in this application are intended to be illustrative and are not intended to be limiting.

What is claimed is:

1. An apparatus comprising:
    transmitting means for transmitting a first optical signal towards a target comprising an optical parametric oscillator;
    receiving means for receiving a second optical signal from said target, the second optical signal is the reflected portion of said first signal, said receiving means comprises an optical parametric amplifier; and
    wavelength matching means for matching the wavelengths produced by the optical parametric amplifier with that of the optical parametric oscillator.

2. The apparatus as described in claim 1, further comprising:
    a first laser for applying photonic energy to the optical parametric oscillator.

3. The apparatus as described in claim 2, wherein the first laser and the optical parametric oscillator together form an optical parametric oscillator laser device.

4. The apparatus as described in claim 2, wherein the first laser and the optical parametric oscillator utilize one optical parametric crystal.

5. The apparatus as described in claim 4, wherein said optical parametric crystal is doped with lasing ions.

6. The apparatus as described in claim 2, further comprising:
    a second laser for applying photonic energy to the optical parametric amplifier.

7. The apparatus as described in claim 6, wherein the second laser and the optical parametric amplifier together form an optical parametric amplifier laser device.

8. The apparatus as described in claim 6, wherein the second laser and the optical parametric amplifier utilize one optical parametric crystal.

9. The apparatus as described in claim 8, wherein said optical parametric crystal is doped with lasing ions.

10. The apparatus as described in claim 1, wherein the optical parametric oscillator and the optical parametric amplifier utilize the same optical parametric crystal.

11. The apparatus as described in claim 1, wherein said wavelength matching utilizes homodyning.

12. The apparatus as described in claim 1, wherein said wavelength matching utilizes heterodyning.

13. The apparatus as described in claim 1, wherein said wavelength matching utilizes Raman sensing.

14. A method of sensing particulars about a target including the steps of:
    transmitting a first beam utilizing an OPOL;
    receiving a second beam utilizing an OPAL; and
    wavelength matching the first beam and the second beam.

15. The sensing method as described in claim 14, wherein said wavelength matching utilizes homodyning.

16. The method as described in claim 14, wherein said wavelength matching utilizes heterodyning.

17. The method as described in claim 16, wherein said wavelength matching utilizes Raman sensing.

* * * * *